Sept. 14, 1965   J. B. CATALDO ETAL   3,206,706
PLUG-IN SECTION FOR BUS DUCT
Original Filed May 25, 1959   2 Sheets-Sheet 2
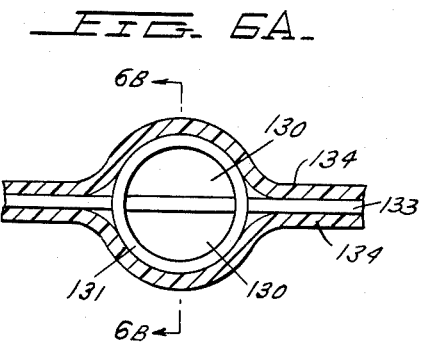
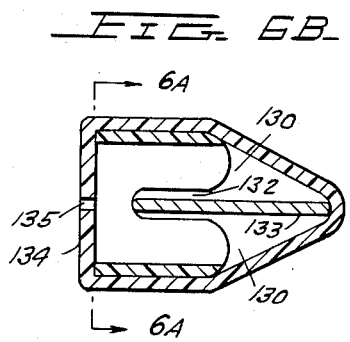
INVENTORS
JOHN B. CATALDO
ROBERT W. THOMAS
BY MICHAEL L. MEAD
OSTROLENK, FABER, GERB & SOFFEN
ATTORNEYS

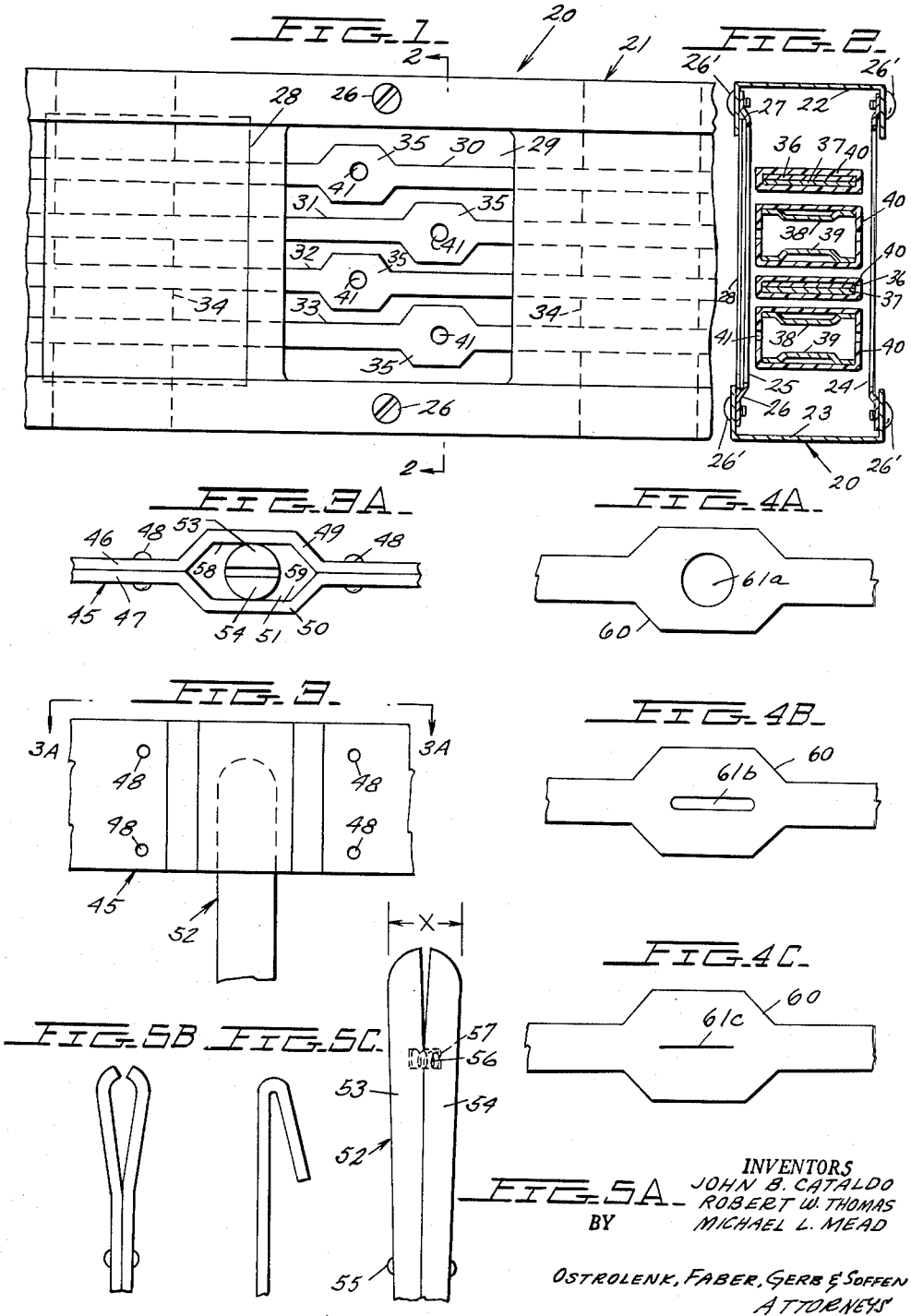

United States Patent Office 3,206,706
Patented Sept. 14, 1965

3,206,706
PLUG-IN SECTION FOR BUS DUCT
John B. Cataldo, Bloomfield Hills, Robert W. Thomas, St. Clair Shores, and Michael L. Mead, Detroit, Mich., assignors to I-T-E Circuit Breaker Company, Philadelphia, Pa., a corporation of Pennsylvania
Original application May 25, 1959, Ser. No. 815,562. Divided and this application Oct. 11, 1962, Ser. No. 229,878
2 Claims. (Cl. 339—22)

This application is a division of copending application Serial No. 815,562, filed May 25, 1959, now abandoned.

The instant invention generally relates to electrical distribution systems comprising bus ducts and more particularly to a novel bus duct construction whereby the tapping of electrical energy from the bus is made in a safe manner.

Bus ducts comprising a plurality of spaced parallel conductors disposed within an elongated housing are described in detail in the J. B. Cataldo copending application Serial No. 772,814, filed November 10, 1958, entitled Clamped Busway Structure, now U.S. Patent 3,088,994, issued May 7, 1963, and assigned to the assignee of the instant invention. Openings are provided in the bus duct housing spaced at intervals along the length thereof whereby electrical energy may be tapped from the bus duct conductors by means of contact fingers which are part of a plug unit of the type illustrated in the W. H. Frank et al. copending application Serial No. 637,575, filed January 31, 1957, entitled Bus Duct Plugs With Cover Operated Retractable Contact Fingers, now U.S. Patent 2,861,139, issued November 18, 1958, and assigned to the assignee of the instant invention.

The ability of the plug device to tap current from the bus duct depends upon the successful coordination between the contact fingers of the plug device and the conductors of the bus duct. This coordination is usually accomplished by means of contact fingers which engage totally exposed portions of the bus conductors which are positioned opposite the housing openings. While the contact engagement may be electrically satisfactory, the bared portions of the conductors pose a safety problem.

Experience has shown that during any portion of the sequence of operation in installing and removing a plug device, that is, opening the duct door, aligning the plug unit, removing the plug unit, and leaving the door opened, etc., it is relatively simple to accidentally bridge the gap between conductors or between a conductor and the duct housing with a metal object. When such accidental contact is made a power arc is started which can severely injure the person installing the plug unit and which also causes extensive damage to the electrical distribution system.

The instant invention substantially reduced the probability of such accidental occurrences by employing duct conductors which are insulated at least at the portions thereof which are accessible through the duct openings and by providing a minimum size opening to receive contact fingers of the plug unit. Thus, the construction of the plug unit may be considerably simplified since retractable contact fingers are no longer required as a safety feature.

Accordingly, a primary object of the instant invention is to provide a novel bus duct construction having a dead front appearance wherein a minimum of conductor material is exposed so as to substantially decrease opportunity for accidental shorts developing between conductors and between a conductor and the bus enclosure.

Another object is to provide a novel bus duct with the conductors thereof having pocket means associated therewith at the plug-in portions of the duct for receiving and surrounding the plug unit contact fingers and acting as the cooperating contacts therefor.

Still another object is to provide a novel bus duct having insulating means at the plug-in portions with a small access opening or slit of lesser area than the cross-section of the plug-in contact fingers.

A further object is to provide a novel pocket construction which permits deflected insulation to position itself so as not to interfere with the contact area for the plug-in contact fingers.

A still further object is to provide a novel resilient type pocket construction serving as a cooperating contact whereby contact pressure is maintained against a solid type of plug unit contact finger.

Briefly, the device of the instant invention comprises a bus duct unit wherein the conductors are each provided with tap means in the form of a pocket positioned at the plug-in- areas of the duct with each pocket being constructed to receive a plug unit contact finger when the finger is in engagement with the conductor of the bus duct. In this manner power is tapped from the bus duct. The pockets are covered with insulation constructed of resilient material having an opening aligned with the pocket opening. The insulation opening may comprise a slit or be of any other desired shape. In any event, the insulation opening is considerably smaller than the pocket means opening and is even smaller than the cross-sectional area of the plug unit contact finger.

When the plug unit contact finger is entered into the pocket means the insulation covering of the pocket means readily deflects and upon withdrawal of the contact finger the insulation resumes its original shape wherein the contact areas of the bus conductors cannot accidentally be contacted.

The objects of the instant invention hereinbefore noted as well as other objects will become readily apparent after reading the following description of the accompanying drawings in which:

FIGURE 1 is a side elevation of a fragmentary portion of a bus duct constructed in accordance with the teachings of the instant invention.

FIGURE 2 is a cross-section taken through line 2—2 of FIGURE 1 looking in the direction of the arrows.

FIGURE 3 is a fragmentary side elevation of conductors of a bus duct unit conductor at the plug-in region with the insulating covering thereof removed.

FIGURE 3A is a plan view of the conductor of FIGURE 3 looking in the direction of arrows 3A—3A.

FIGURES 4A–4C are plan views of the portion of the conductor illustrated in FIGURE 3, with the insulating covering thereon, illustrating the various shapes which the opening of the insulation can assume.

FIGURES 5A–5C are side elevations illustrating three different constructions for resilient type plug unit contact fingers.

FIGURE 6A is a cross-section, taken through lines 6A–6A of FIGURE 6B looking in the direction of the arrows, illustrating a modified pocket construction wherein finger type contacts engage both sides of the bus conductor.

FIGURE 6B is a cross-section taken through lines 6B–6B of FIGURE 6A looking in the direction of the arrows.

Now referring to the figures and more particularly to FIGURES 1 and 2, bus duct unit 20 comprises an elongated housing 21 constructed of U-shaped members 22, 23 at the top and bottom thereof secured to side plates 24, 25 by screw means 26'. Side plate 25 includes offset portions at the long edges thereof whereby spaces 26, 27 are formed between side plate 25 and one arm of U-shaped members 22, 23. Door 28 is disposed within spaces 26, 27 so as to be slidable therein.

Housing 21 is provided with a plurality of longitudinally spaced plug-in openings 29, only one of which is illustrated, in side plate 25. Bus duct unit 20 also includes four parallel conductors 30–33 disposed within housing 21 and maintained in operative position by insulator means 34 in a manner well known to the art.

Each of the conductors 30–33 is provided with a pocket means 35 for each plug-in location defined by a housing opening 29. It is to be noted that pocket means 35 of conductors 31 and 33 are longitudinally spaced from pocket means 35 of conductors 30 and 32 so as to minimize the size of housing openings 29. Thus, it can be said that pocket means 35 of bus bars 30–33 are positioned in staggered relationship.

Each of the conductors 30–33 are comprised of a first and a second laminate 36, 37 which abut one another for substantially the entire length of bus duct unit 20. The pocket means 35 is formed by outwardly extending embossed portions 38, 39 of laminates 36, 37, respectively. Conductors 30–33 are covered for the entire lengths thereof by resilient insulating material 40, in a manner fully explained in the aforesaid copending application 772,814. Insulation 40 is provided with round openings 41 which are aligned with the openings of pockets 35 for a reason to be hereinafter explained.

FIGURES 3 and 3A illustrate a conductor 45 formed of laminates 46, 47 drawn together by rivets 48. Laminates 46, 47 include outwardly extending portions 49, 50, respectively which cooperate to form pocket 51. Pocket 51 is adapted to receive a resilient type contact finger 52 (FIGURE 5A) which comprises two sections 53, 54 of conducting material joined by rivet 55. A compression spring 56 disposed within recess 57 is positioned between members 53, 54 thereby urging these members away from one another into good electrical contact with the inner surfaces 58, 59, respectively of pocket means 51. Compression spring 56 may be eliminated in contact fingers of the type illustrated in FIGURES 5B and 5C which are comprised of material inherently resilient in character.

The formations 49, 50 comprising pocket 51 are adapted to be covered by a sleeve 60 (FIGURES 4A–4C) having variously shaped access openings 61a–61c through which contact finger 52 must pass before entering pocket 51. Pocket means opening 61a is round, pocket means opening 61b is of elongated shape, and pocket means 61c is a mere slit. It is to be noted that each of the openings 61a–61c, in the normal positions thereof, illustrated in FIGURES 4A–4C, are considerably smaller in size than the opening which pocket 51 presents to contact finger 52. Thus, when the door 28 for the plug-in region opening 29 is opened a dead front appearance is presented so that the chances of accidentally shorting the conductors of bus duct unit 20 to housing 21 or creating a short between conductors is, for all practical purposes, impossible.

Since the material which forms sleeve 60 is resilient in nature contact finger 52 when inserted into pocket 51 will enlarge the access openings 61a–61c and upon withdrawal of contact finger 52 the access openings 61a–61c will return to their normal position.

Up to this point, each pocket means described has been considered to be constructed of rigid material with the parts being fastened securely to each other. Contact pressure has been obtained by a separate spring in the plug unit contact fingers (FIGURE 5A) or by making the contact fingers of inherently resilient material either in two sections (FIGURE 5B) or by having a single section bent over portion in the form of a V at the end thereof (FIGURE 5C). However, the pocket formed by the conductors and other members may also be made resilient so as to be capable of accepting solid, stab type contact fingers.

The embodiments of this invention hereinbefore described utilize plug unit contact fingers which make contact against the inside walls of the pocket forming laminates and parts. It is possible to reverse the construction of the pocket means for utilization with clip type contact fingers which engage the bus duct conductors on opposite sides thereof.

FIGURES 6A and 6B illustrate a modification. Pocket means 130, 130 are formed by a ring-like member 131 having diametrically opposed slots 132. Bus bar 133 is entered into slots 132 so as to be positioned along a diameter of ring-like member 131. Sleeve-like resilient insulator 134 is placed over pocket means 130, 130 with the access opening 135 of insulator means 134 being in alignment with the entrance opening to pocket means 130, 130.

It is to be understood that this invention may be carried out by constructing the pockets of any given configuration depending upon the size and contour of the plug unit contact fingers. The insulation means may be resilient and continuous. While a tube or sleeve has proven to be the most practical any form such as sheet, tape, potting compounds or epoxy or plastisol can also be used. However, if desired the insulation can be both discontinuous and rigid, being confined to the plug in region of the bus duct unit.

Thus, this invention provides a novel construction for a bus duct unit which achieves a substantially dead front appearance, that is, the conductors in the plug-in regions are substantially covered by insulating material so as to prevent accidental shorts from occurring during installation and removal of plug units.

Although we have here described preferred embodiment of our novel invention, many variations and modifications will now be apparent to those skilled in the art, and we therefore prefer to be limited, not by the specific disclosure herein, but only by the appending claims.

The embodiments of the invention in which an exclusive privilege or property is claimed are defined as follows:

1. A bus duct comprised of an elongated housing and a plurality of longitudinally extending electrical conductors disposed within said housing; said housing having an opening therein defining a location at which power may be tapped from said bus duct by means of a plug unit; pocket means individual to each of said conductors having an opening operatively positioned in alignment with said housing opening to receive plug unit contact fingers which engage said conductors; an insulating means, individual to each of said conductors covering its associated conductor for at least a portion thereof aligned opposite said housing opening and also covering said pocket means; said insulating means having an opening in alignment with said pocket opening and operatively positioned whereby a plug unit contact finger entering said pocket means opening must first pass through said insulating means opening; said insulating means opening being smaller than said pocket means opening; each of said pocket means being formed by a ring-like member having aligned slots therein; each of said conductors being entered into the slots of its associated pocket means ring-like member; said insulating means being comprised of a resilient material; said insulating means being spaced from said conductors at said pocket means by said ring-like members; said ring-like members being maintained in position solely by said conductors and said insulating means.

2. The combination comprising an electrical conductor and pocket means having an opening constructed and operatively positioned to receive a stab type contact which is electrically engageable with said conductor; insulating means covering said conductor for at least a portion of the length thereof; said insulating means also covering said pocket means; said insulating means having an opening smaller in size than said pocket means opening and in alignment therewith; said pocket means being formed by a ring-like member having aligned slots; said conductor being disposed within said slots; said insulating means spaced from said conductor at said pocket means by said ring-like member; said ring-like member being maintained in position solely by said conductor and said insulating means.

References Cited by the Examiner

UNITED STATES PATENTS

| | | | |
|---|---|---|---|
| 2,192,587 | 3/40 | Harvey | 339—22 |
| 2,284,097 | 5/42 | La Jone | 339—21 |
| 2,411,128 | 11/46 | Carlson | 339—22 |
| 2,619,515 | 11/52 | Doane | 339—111 |
| 2,634,312 | 4/53 | Batcheller | 339—256 |
| 3,018,320 | 1/62 | Rowe | 339—22 |
| 3,042,889 | 7/62 | Johnston et al. | 339—22 |

JOSEPH D. SEERS, *Primary Examiner.*

THOMAS J. HICKEY, *Examiner.*